United States Patent
Doane et al.

(10) Patent No.: US 12,460,753 B2
(45) Date of Patent: Nov. 4, 2025

(54) SEAL RETAINING CONFIGURATION AND METHOD

(71) Applicant: Baker Hughes Oilfield Operations LLC, Houston, TX (US)

(72) Inventors: James Doane, Friendswood, TX (US); Farhat Shaikh, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 310 days.

(21) Appl. No.: 17/992,367

(22) Filed: Nov. 22, 2022

(65) Prior Publication Data
US 2024/0167594 A1    May 23, 2024

(51) Int. Cl.
*F16L 21/02*    (2006.01)
*E21B 17/02*    (2006.01)
*E21B 33/129*   (2006.01)

(52) U.S. Cl.
CPC ............. *F16L 21/02* (2013.01); *E21B 17/02* (2013.01); *E21B 33/129* (2013.01)

(58) Field of Classification Search
CPC ....... F16L 21/02; F16L 21/03; F16L 37/0842; E21B 17/02; E21B 2200/01
USPC .................................. 285/321, 404
See application file for complete search history.

(56) References Cited

U.S. PATENT DOCUMENTS

| | | | | |
|---|---|---|---|---|
| 4,289,339 A | * | 9/1981 | Hansen | F16L 37/146 285/404 |
| 4,293,148 A | * | 10/1981 | Milberger | E21B 17/046 285/305 |
| 4,349,205 A | | 9/1982 | McGee et al. | |
| 4,493,373 A | | 1/1985 | Jackson | |
| 4,570,980 A | * | 2/1986 | Goward | F16L 37/144 285/321 |
| 5,584,512 A | * | 12/1996 | Carstensen | F16L 21/08 285/321 |
| 5,845,945 A | * | 12/1998 | Carstensen | F16L 21/08 285/321 |

(Continued)

OTHER PUBLICATIONS

Notification of Transmittal of the International Search Report and the Written Opinion of the International Searching Authority, or the Declaration; PCT/US2023/080320; Mail date: Mar. 19, 2024; 11 pages.

(Continued)

*Primary Examiner* — David Bochna
(74) *Attorney, Agent, or Firm* — Baker Hughes Patent Organization (57) ABSTRACT

A seal retaining configuration including a tubular member having a plurality of grooves that are a portion of a chord of the tubular member. Retainers are engaged with the chords to retain a seal. Further, barriers are adjacent the retainer and the seal. A tubular system including a first tubular comprising an inside diameter surface of a diameter D1, a second tubular including a first outside diameter surface of diameter D2 smaller than D1 and a second outside diameter surface of diameter D3, being greater than D2 and lesser than D1. The inside diameter surface includes a first groove, and a second groove to accept retainers. A seal having an inside diameter smaller than D3 and an outside diameter at least as large as D1 is disposed between the first and second tubular members.

17 Claims, 5 Drawing Sheets

(56) References Cited

U.S. PATENT DOCUMENTS

| | | | | |
|---|---|---|---|---|
| 5,964,483 | A | * | 10/1999 | Long .................... F16L 37/144 285/305 |
| 5,988,692 | A | * | 11/1999 | Springer ................ F16L 47/24 285/321 |
| 6,494,495 | B1 | * | 12/2002 | Cunningham ........ E21B 17/046 285/404 |
| 7,503,591 | B2 | * | 3/2009 | Beeren ................. F16L 37/144 285/305 |
| 2004/0169371 | A1 | * | 9/2004 | Hagiya ................. F16L 37/146 285/404 |
| 2013/0181439 | A1 | | 7/2013 | Alhaug |
| 2016/0047178 | A1 | | 2/2016 | Thomson et al. |
| 2021/0002964 | A1 | | 1/2021 | Nelson et al. |
| 2021/0116063 | A1 | * | 4/2021 | Chung ................... F16L 21/02 |

OTHER PUBLICATIONS

"O-rings and backup-rings"; SKF.com; Internet Nov. 2, 2022: https://www.skf.com/group/products/industrial-seals/hydraulic-seals/o-rings-and-back-up-rings; 4 pages.

* cited by examiner

SEAL RETAINING CONFIGURATION AND METHOD

BACKGROUND

In the resource recovery and fluid sequestration industries seals are often needed between tubular members. Also common is where those seals are an integral part of a piston system and hence a larger piston area can be beneficial. Larger piston areas can become difficult to achieve where there are larger portions such as premium threads that create large outside diameters and yet limitations on tool drift diameters such that seals might need to be annularly small. An annularly small seal generally is consistent with a smaller piston area. The art would appreciate configurations and methods of construction that can reap larger piston areas in such situations.

SUMMARY

An embodiment of a seal retaining configuration including a tubular member comprising a body and an inside diameter surface, a plurality of grooves extending from the inside diameter surface into the body of the tubular member, at least one of the grooves being a portion of a chord of the tubular member that intersects the body of the tubular member, a first retainer engaged with a first groove of the plurality of grooves, a second retainer engaged with a second groove of the plurality of grooves, a first perimetrically discontinuous antiextrusion barrier disposed adjacent the first retainer, a second perimetrically discontinuous antiextrusion barrier disposed adjacent the second retainer, and a seal retained between the first perimetrically discontinuous antiextrusion barrier and the second perimetrically discontinuous antiextrusion barrier.

An embodiment of a tubular system including a first tubular comprising a body and an inside diameter surface, the inside diameter surface being of a diameter D1, a second tubular including a first outside diameter surface of diameter D2, disposed radially inwardly of the of the first tubular inside diameter surface when assembled, and a second outside diameter surface of diameter D3, being greater than D2 and lesser than D1, D3 ranges from about 0.125 to about 0.5 inches larger than D2, a first groove in the inside diameter surface of the first tubular, a second groove in the inside diameter surface of the first tubular, a seal having an inside diameter smaller than D3 and an outside diameter at least as large as D1, a first seal retainer engaged with the first groove, a second seal retainer engaged with the second groove, a first perimetrically discontinuous antiextrusion barrier disposed adjacent the first retainer, a second perimetrically discontinuous antiextrusion barrier disposed adjacent the second retainer and a seal retained between the first perimetrically discontinuous antiextrusion barrier and the second perimetrically discontinuous antiextrusion barrier.

An embodiment of a method for assembling the tubular system as in any prior embodiment including sliding the first tubular inside diameter surface D1 over the second tubular second outside diameter surface D3, positioning the first tubular inside diameter surface D1 radially outwardly of second tubular first outside diameter surface D2, disposing the first retainer in the first groove, stretching the seal over second tubular second outside diameter D3, inserting the seal into the first tubular inside diameter surface D1, adjacent the first retainer, and disposing the second retainer in the second groove.

An embodiment of a borehole system including a borehole in a subsurface formation, a string in the borehole, and a tubular system disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
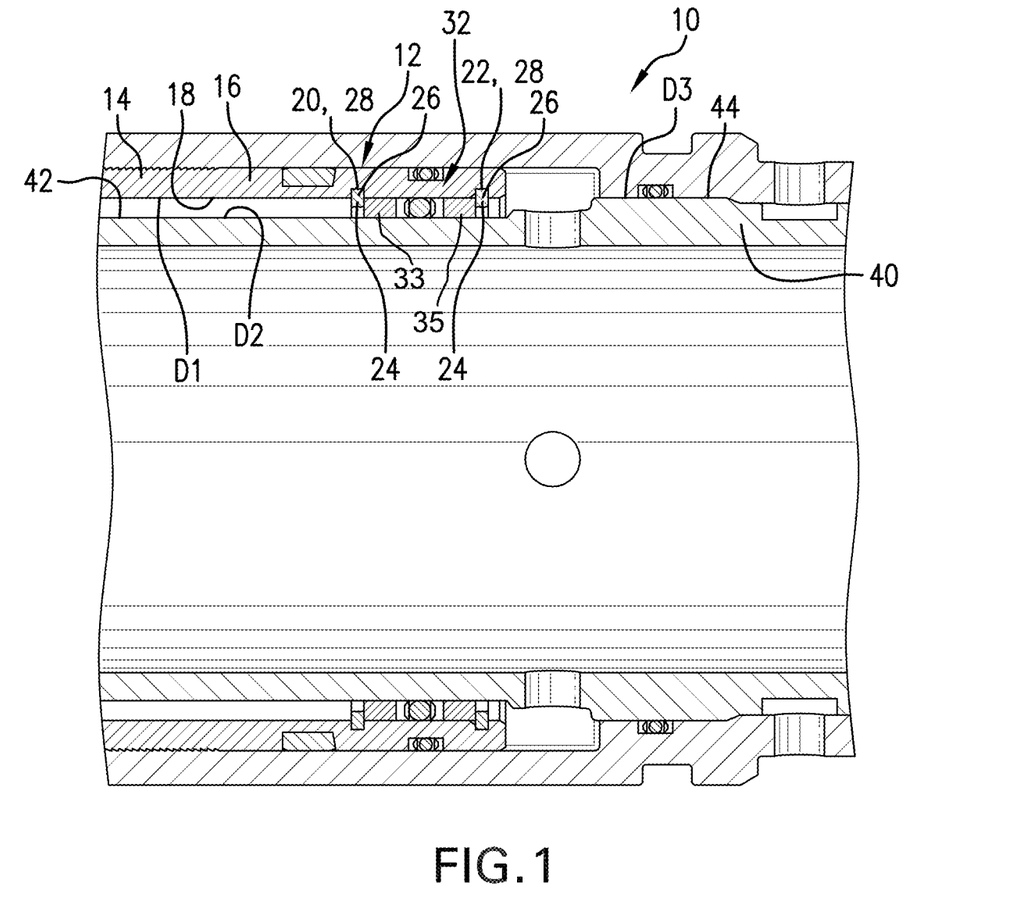
FIG. 1 is a section view of a tubular system as disclosed herein.

Referring to FIG. 1, a first embodiment of a tubular system 10 is illustrated. The view also illustrates a seal retaining configuration 12 that makes up a part of the tubular system 10. The configuration 12 comprises a tubular member 14 comprising a body 16 and an inside diameter surface 18. A plurality of grooves 20 and 22 extend from the inside diameter surface 18 into the body 16 of the tubular member 14. Each groove 20 and 22 may be of the same type or different type. Further grooves contemplated herein comprise circumferentially complete grooves or circumferentially incomplete grooves. The grooves each accept some type of retainer 24. Complete grooves are receptive to standard retaining rings 26 such as snap rings, C-rings and spiral rings, for example. Circumferentially incomplete rings may employ castellated rings of the same types as noted above where the castellations engage the groove and the body of the rings rest on the inside diameter surface 18. Alternatively, and while these are still considered grooves generically with regard to construction of independent claims appended hereto, to provide clarity in the mind of the reader an additional numeral is used to identify the alternative. The alternative is hence described as groove 28 (see FIG. 3), which are arranged as chords through the curvature of the tubular member 14 and are receptive to pins 30 (roll pins, spring pins, solid pins, etc.) urged through the tubular member 14. Specifically, grooves 20 or 22 that are circumferentially complete or incomplete and receive rings as mentioned appear the same in cross section and hence are as appears in FIG. 1. Circumferentially incomplete grooves 28 that engage pins 30, however, have a different appearance and may be appreciated by reference to FIGS. 2 and 3.

It is to be appreciated that a retainer 24 (whether the retainer be a ring 26 or a pin 30) is disposed in each groove 20, 22 or 28. The retainer 24 provides for a retention of a seal 32, a first antiextrusion barrier 33 and a second antiextrusion barrier 35 therebetween. The seal 32 may comprise one or more of an o-ring, an o-ring with backups, a bonded seal, etc. The antiextrusion barriers 33 and 35 are configured as perimetrically discontinuous. That is to say that at least one break is provided in an otherwise perimetrically (e.g. circumferentially, or any other closed geometric shape) complete shape. It is also contemplated that barrier 33 or 35 may have a plurality of discontinuities about the periphery thereof. Specifically, segments of the geometric shape selected may be two segments, three segments, four segments, etc. as desired with the segments together forming the geometric shape of the barrier (circle, hexagon, square, triangle, etc.). The discontinuity addresses the diametrical issues presented in systems having such issues as discussed in greater detail hereinbelow.

Figure 2:
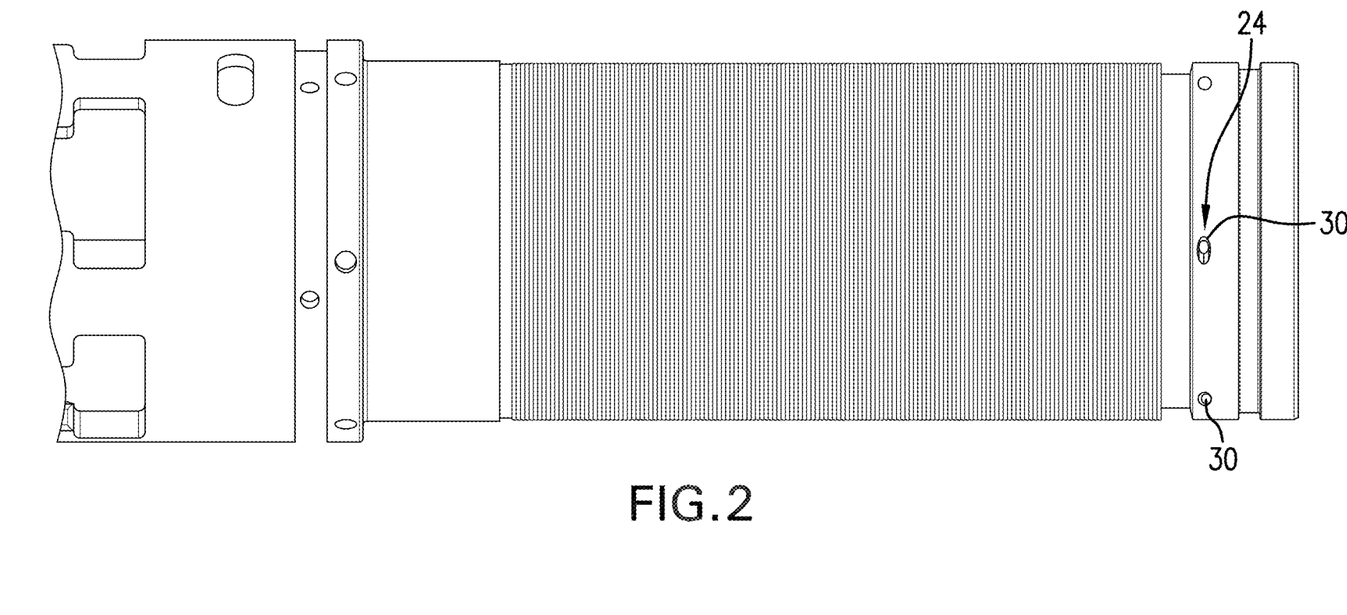
FIG. 2 is a side view of an alternate tubular member for the tubular system disclosed herein.
Figure 3:
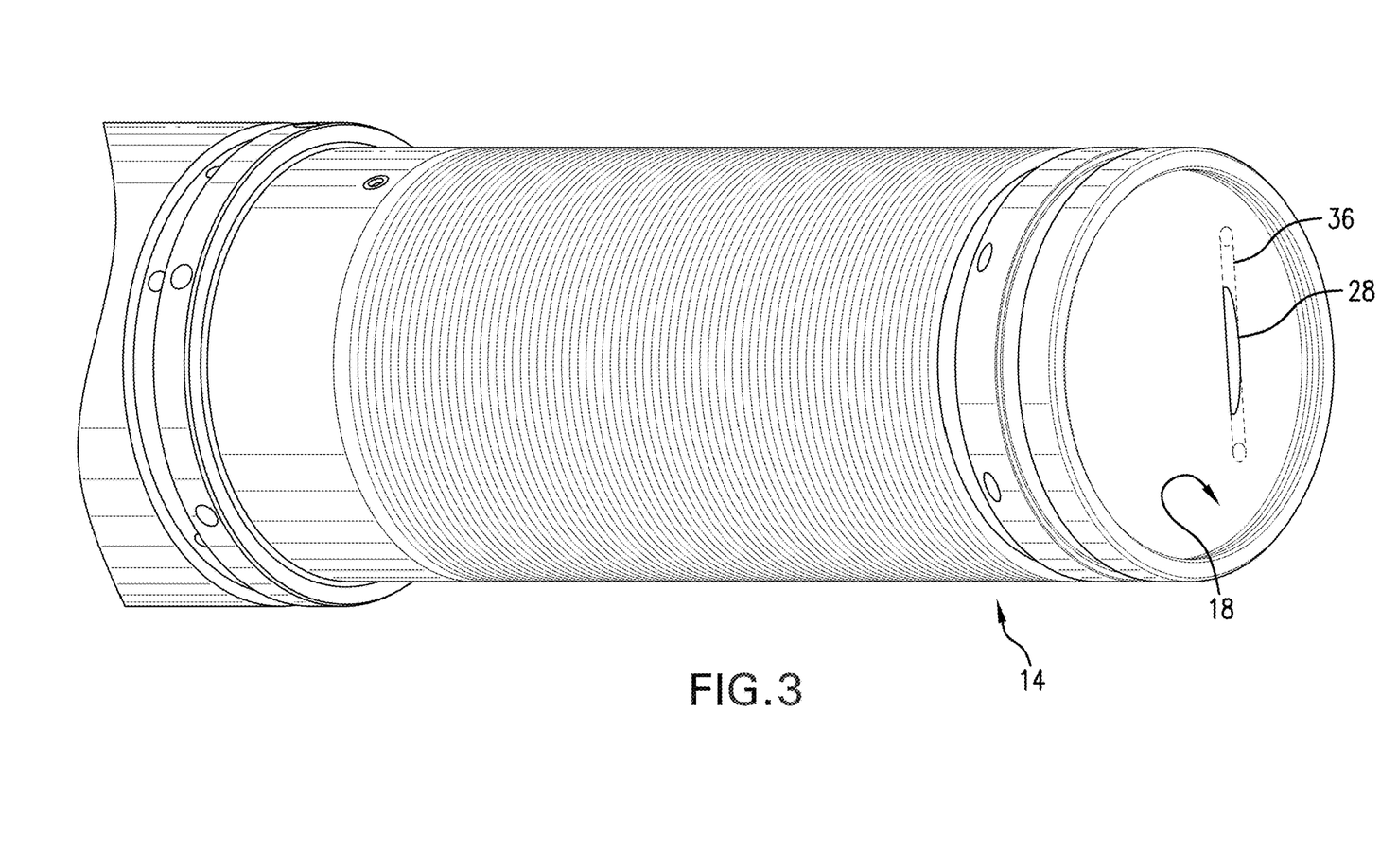
FIG. 3 is a perspective view of the tubular member of FIG. 2.
Figure 4:
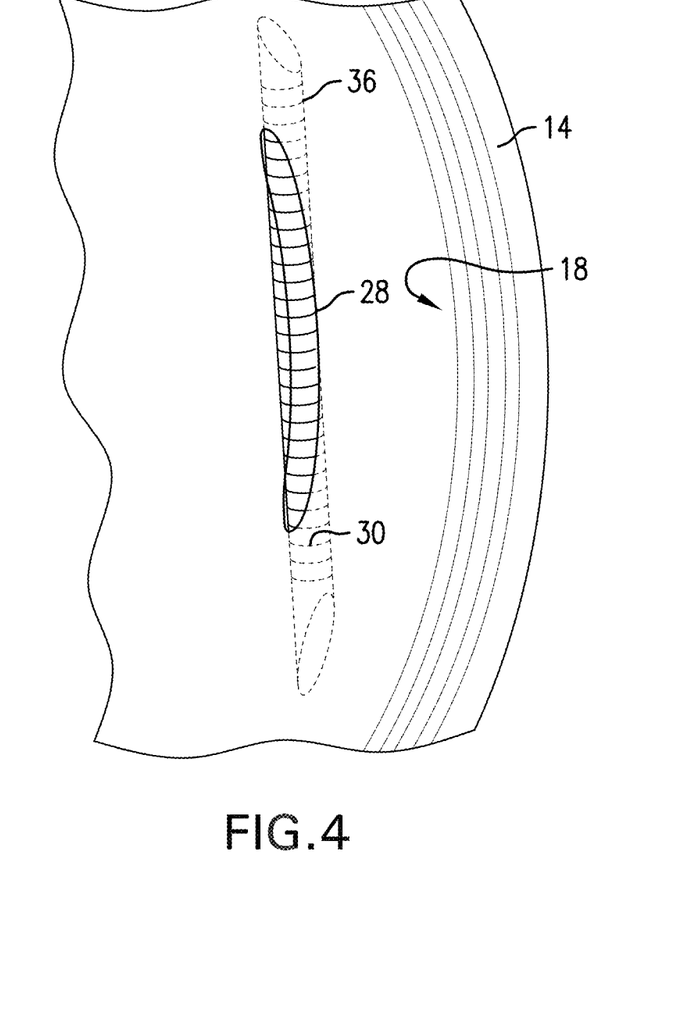
FIG. 4 is an enlarged view of a portion of FIG. 3.

In the case of FIGS. 2 and 3, the groove 28 is a portion of a chord through the tubular member 14. Specifically, a hole 36 drilled through the member 14 where the drill will emerge at the inside diameter surface 18 about halfway between where it enters and exits the member 14. The groove 28 is more than a single tangent point of intersection between the drill hole and the inside surface such that the material removed from the inside diameter surface 18 that is open to the inside of the member is at least oval in shape. FIG. 3 illustrates an oval shape of groove 28. The oval may be longer or shorter depending upon the whether the chord selected is longer or shorter across the member 14. The pin 30 will therefore protrude into the space inside of the inside diameter surface 18 by an amount that is related to where the chord is placed, see FIG. 4. The longer the groove 28, then the less the pin 30 will protrude into the inside space of the member 14. Conversely, the shorter the groove, the greater the pin 30 protrudes into the internal space of the member 14. The greater the protrusion into the internal space, the greater the abutment that is provided for the seal 32 that is to be retainer by the retainer. Also however, the outside diameter of any tube disposed in the member 14 will restrict how far into the space the pin 30 may protrude before experiencing interfering contact with the tube disposed in the member 14. Accordingly, a chord is to be selected that provides a sufficient abutment and yet does not cause interference with a tubular disposed within the member 14. In embodiments, there may be 1, 2, 3, 4, 5 or in some cases more grooves 28 arranged about a circumferential path of the tubular member 14 depending upon actual diameter of that tubular member 14.

It is to be understood that both grooves 20, 28, and 22, 28 could be for rings 26, both grooves 28 could be for pins 30 or the first groove 20, 28 could be for a ring and the second groove 22, 28 for a pin 30, or vice versa.

Each of the configurations disclosed enables an expansion of piston area for the tubular system 10 beyond what is available in the prior art. Specifically, and referring back to FIG. 1, the member 14 inside diameter surface 18 has a diameter D1. A second tubular 40 has a first outside diameter surface 42 of diameter D2 and a second outside diameter surface 44 of diameter D3. In embodiments, D3 may be in a range of about 0.125 inch to about 0.5 inch greater in diameter than D2. The member 14 must be assembled to second tubular 40 from the right of the drawing for various reasons that are not germane to the disclosure. In order for this to occur, the diameter D3 must be less than the diameter D1. This can be problematic with premium threads of a large diameter as the diameter D3 will be large relative to a drift diameter of the complete system 10. In this case, the resulting gap between the tubulars 14 and 40 would be small and therefor leave only a small piston area for a seal therebetween. The inventors hereof determined to increase the piston area but that creates a problem for installation of the seal 32. Something needs to retain the seal and shoulders of the prior art do not allow for the clearance needed over D3 without using a very small piston area. Increasing the potential for piston area of seal 32 is achieved herein by reducing the diameter D2 of the tubular 40 at a portion thereof that does not require the larger diameter D3. Then, a way to retain the seal is required. In the first embodiment hereof, the rings 26 are configured with an inside diameter smaller than D3 and an outside diameter larger than D1. Such rings 26 are then stretched to fit over D3 (without yield) and forced into D1 (again elastically). This provides a retainer structure that is larger than could be achieved with a shoulder and yet the system 10 is still assemblable. The seal 32 may also be stretched over D3 and squeezed into D1 for the same effect. For embodiments employing one or more of the pins 30 in one or more of the grooves the pins may be installed in the first groove 20, 28 before or after the seal 32 is placed and the pins in groove 22, 28 must be placed after seal 32 is placed. The disclosure enables larger than expected piston areas for the seal 32 in tubular systems that use large threaded ends, such as premium threads, that are designed for higher pressure duty and accordingly create large D3 surfaces on tubular member 40.

Figure 5:
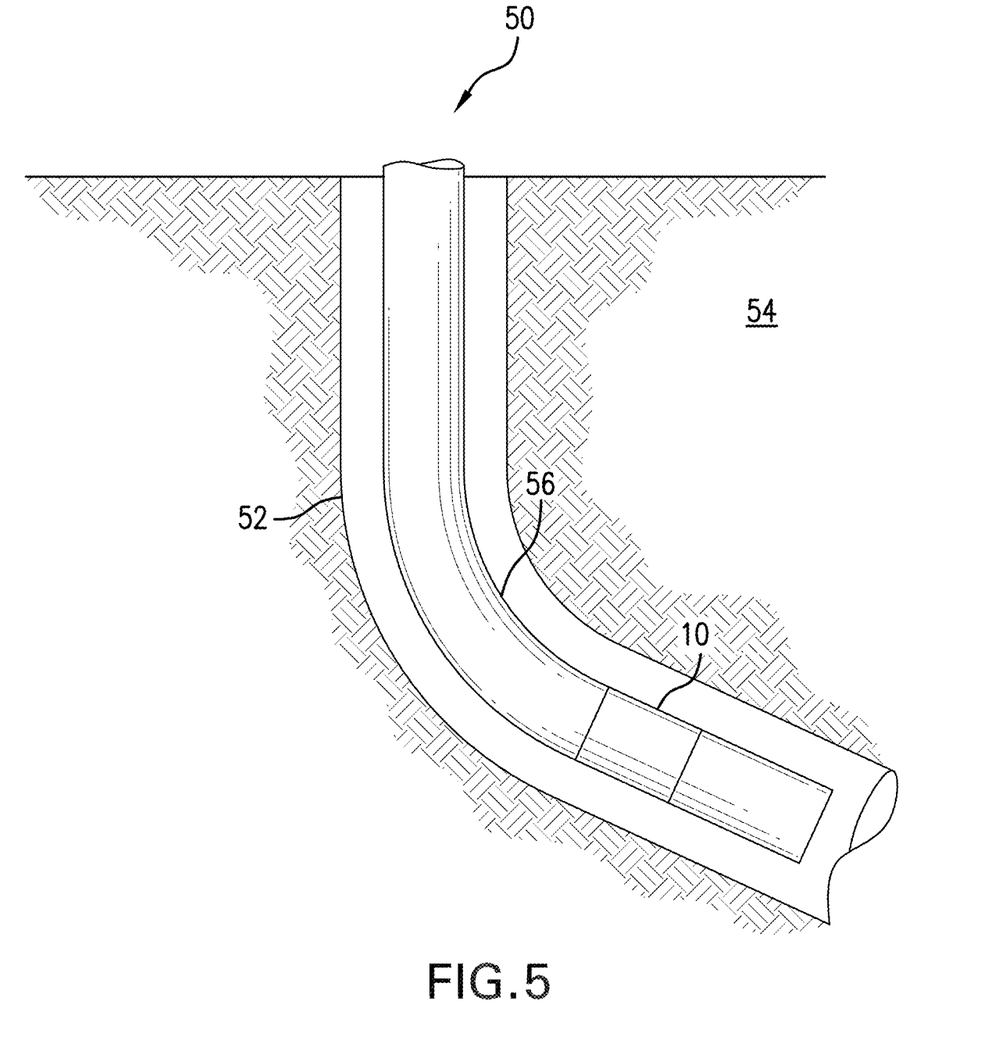
FIG. 5 is a view of a borehole system including the tubular system as disclosed herein.

Referring FIG. 5, a borehole system 50 is illustrated. The system 50 comprises a borehole 52 in a subsurface formation 54. A string 56 is disposed within the borehole 50. A tubular system 10 as disclosed herein is disposed within or as a part of the string 56.

Set forth below are some embodiments of the foregoing disclosure:

Embodiment 1

A seal retaining configuration including a tubular member comprising a body and an inside diameter surface, a plurality of grooves extending from the inside diameter surface into the body of the tubular member, at least one of the grooves being a portion of a chord of the tubular member that intersects the body of the tubular member, a first retainer engaged with a first groove of the plurality of grooves, a second retainer engaged with a second groove of the plurality of grooves, a first perimetrically discontinuous antiextrusion barrier disposed adjacent the first retainer, a second perimetrically discontinuous antiextrusion barrier disposed adjacent the second retainer, and a seal retained between the first perimetrically discontinuous antiextrusion barrier and the second perimetrically discontinuous antiextrusion barrier.

Embodiment 2

The configuration as in any prior embodiment, wherein another of the plurality of grooves other than the at least one groove of the plurality of grooves being circumferential of the tubular member.

Embodiment 3

The configuration as in any prior embodiment, wherein another of the plurality of grooves other than the at least one groove of the plurality of grooves is a chord of the tubular member that intersects the body of the tubular member.

Embodiment 4

The configuration as in any prior embodiment, wherein the first groove is part circumferential of the tubular member.

Embodiment 5

The configuration as in any prior embodiment, wherein the second groove is part circumferential of the tubular member.

Embodiment 6

The configuration as in any prior embodiment, wherein the discontinuity in either the first or second barrier or both is a plurality of discontinuities.

Embodiment 7

A tubular system including a first tubular comprising a body and an inside diameter surface, the inside diameter surface being of a diameter D1, a second tubular including a first outside diameter surface of diameter D2, disposed radially inwardly of the of the first tubular inside diameter surface when assembled, and a second outside diameter surface of diameter D3, being greater than D2 and lesser than D1, D3 ranges from about 0.125 to about 0.5 inches larger than D2, a first groove in the inside diameter surface of the first tubular, a second groove in the inside diameter surface of the first tubular, a seal having an inside diameter smaller than D3 and an outside diameter at least as large as D1, a first seal retainer engaged with the first groove, a second seal retainer engaged with the second groove, a first perimetrically discontinuous antiextrusion barrier disposed adjacent the first retainer, a second perimetrically discontinuous antiextrusion barrier disposed adjacent the second retainer and a seal retained between the first perimetrically discontinuous antiextrusion barrier and the second perimetrically discontinuous antiextrusion barrier.

Embodiment 8

A system as in any prior embodiment, wherein the first seal retainer is a snap ring, spiral ring, or C-ring.

Embodiment 9

A system as in any prior embodiment, wherein the wherein the second seal retainer is a snap ring, spiral ring, or C-ring.

Embodiment 10

A system as in any prior embodiment, wherein the first seal retainer includes a pin.

Embodiment 11

A system as in any prior embodiment, wherein the second seal retainer includes a pin.

Embodiment 12

A method for assembling the tubular system as in any prior embodiment including sliding the first tubular inside diameter surface D1 over the second tubular second outside diameter surface D3, positioning the first tubular inside diameter surface D1 radially outwardly of second tubular first outside diameter surface D2, disposing the first retainer in the first groove, stretching the seal over second tubular second outside diameter D3, inserting the seal into the first tubular inside diameter surface D1, adjacent the first retainer, and disposing the second retainer in the second groove.

Embodiment 13

The method as in any prior embodiment, wherein the disposing of the first retainer is stretching the first retainer over the second tubular second outside diameter D3 and inserting the retainer in the first groove.

Embodiment 14

The method as in any prior embodiment, wherein the disposing of the second retainer is stretching the first retainer over the second tubular second outside diameter D3 and inserting the retainer in the second groove.

Embodiment 15

The method as in any prior embodiment, wherein the disposing of the first retainer is by inserting the retainer through a first opening in an outside diameter surface of the first tubular that is aligned with the first groove and urging the retainer into engagement with the first groove.

Embodiment 16

The method as in any prior embodiment, wherein the disposing of the second retainer is by inserting the retainer through a second opening in an outside diameter surface of the first tubular that is aligned with the second groove and urging the retainer into engagement with the second groove.

Embodiment 17

A borehole system including a borehole in a subsurface formation, a string in the borehole, and a tubular system as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A seal retaining configuration comprising:
   a tubular member comprising a body and an inside diameter surface;
   a plurality of grooves extending from the inside diameter surface into the body of the tubular member, at least one of the grooves being a portion of a chord of the tubular member that intersects the body of the tubular member;
   a first retainer engaged with a first groove of the plurality of grooves;
   a second retainer engaged with a second groove of the plurality of grooves;
   a first perimetrically discontinuous antiextrusion barrier disposed adjacent the first retainer;
   a second perimetrically discontinuous antiextrusion barrier disposed adjacent the second retainer; and
   a seal retained between the first perimetrically discontinuous antiextrusion barrier and the second perimetrically discontinuous antiextrusion barrier, the first and second antiextrusion barriers configured to resist extrusion of the seal.

2. The configuration as claimed in claim 1, wherein another of the plurality of grooves other than the at least one groove of the plurality of grooves being circumferential of the tubular member.

3. The configuration as claimed in claim 1, wherein another of the plurality of grooves other than the at least one groove of the plurality of grooves is a chord of the tubular member that intersects the body of the tubular member.

4. The configuration as claimed in claim 1, wherein the first groove is part circumferential of the tubular member.

5. The configuration as claimed in claim 1, wherein the second groove is part circumferential of the tubular member.

6. The configuration as claimed in claim 1, wherein the discontinuity in either the first or second barrier or both is a plurality of discontinuities.

7. A tubular system comprising:
   a first tubular comprising a body and an inside diameter surface, the inside diameter surface being of a diameter D1;
   a second tubular composed of a material, comprising:
      a first outside diameter surface of the material of the second tubular of diameter D2, disposed radially inwardly of the of the first tubular inside diameter surface when assembled, and
      a second outside diameter surface of the material of the second tubular of diameter D3, being greater than D2 and lesser than D1, D3 ranges from about 0.125 to about 0.5 inches larger than D2;
   a first groove in the inside diameter surface of the first tubular;
   a second groove in the inside diameter surface of the first tubular;
   a seal having an inside diameter smaller than D3 and an outside diameter at least as large as D1;
   a first seal retainer engaged with the first groove;
   a second seal retainer engaged with the second groove;
   a first perimetrically discontinuous antiextrusion barrier disposed adjacent the first retainer to resist extrusion of the seal;
   a second perimetrically discontinuous antiextrusion barrier disposed adjacent the second retainer; and
   the seal retained between the first perimetrically discontinuous antiextrusion barrier and the second perimetrically discontinuous antiextrusion barrier.

8. A system as claimed in claim 7, wherein the first seal retainer is a snap ring, spiral ring, or C-ring.

9. A system as claimed in claim 7, wherein the wherein the second seal retainer is a snap ring, spiral ring, or C-ring.

10. A system as claimed in claim 7, wherein the first seal retainer includes a pin.

11. A system as claimed in claim 7, wherein the second seal retainer includes a pin.

12. A method for assembling the tubular system as claimed in claim 7 comprising:
    sliding the first tubular inside diameter surface D1 over the second tubular second outside diameter surface D3;
    positioning the first tubular inside diameter surface D1 radially outwardly of second tubular first outside diameter surface D2;
    disposing the first retainer in the first groove;
    stretching the seal over second tubular second outside diameter D3;
    inserting the seal into the first tubular inside diameter surface D1, adjacent the first retainer; and
    disposing the second retainer in the second groove.

13. The method as claimed in claim 12, wherein the disposing of the first retainer is stretching the first retainer over the second tubular second outside diameter D3 and inserting the retainer in the first groove.

14. The method as claimed in claim 12, wherein the disposing of the second retainer is stretching the first retainer over the second tubular second outside diameter D3 and inserting the retainer in the second groove.

15. The method as claimed in claim 12, wherein the disposing of the first retainer is by inserting the retainer through a first opening in an outside diameter surface of the first tubular that is aligned with the first groove and urging the retainer into engagement with the first groove.

16. The method as claimed in claim 12, wherein the disposing of the second retainer is by inserting the retainer through a second opening in an outside diameter surface of the first tubular that is aligned with the second groove and urging the retainer into engagement with the second groove.

17. A borehole system comprising:
    a borehole in a subsurface formation;
    a string in the borehole; and
    a tubular system as claimed in claim 7 disposed within or as a part of the string.

* * * * *